(12) United States Patent
Scheiner

(10) Patent No.: US 6,940,609 B2
(45) Date of Patent: Sep. 6, 2005

(54) METHOD AND SYSTEM FOR MEASURING THE TOPOGRAPHY OF A SAMPLE

(75) Inventor: David Scheiner, Ganei Yehuda (IL)

(73) Assignee: Nova Measuring Instruments, Ltd., Rehovot (IL)

(*) Notice: Subject to any disclaimer, the term of this patent is extended or adjusted under 35 U.S.C. 154(b) by 217 days.

(21) Appl. No.: 10/214,462

(22) Filed: Aug. 8, 2002

(65) Prior Publication Data

US 2003/0058454 A1 Mar. 27, 2003

(30) Foreign Application Priority Data

Aug. 8, 2001 (IL) .................................................. 144805

(51) Int. Cl.[7] .............................................. G01B 11/30
(52) U.S. Cl. ..................... 356/605; 356/612; 250/237 G
(58) Field of Search ................. 356/601–640; 250/559.19–559.23, 237 G, 559.27–559.38

(56) References Cited

U.S. PATENT DOCUMENTS

| | | | |
|---|---|---|---|
| 3,858,981 A | * | 1/1975 | Jaerisch et al. ............. 356/512 |
| 5,307,152 A | | 4/1994 | Boehnlein et al. |
| 5,493,400 A | | 2/1996 | Gröbler et al. |
| 5,610,719 A | * | 3/1997 | Allen et al. .................. 356/614 |
| 5,671,050 A | | 9/1997 | De Groot |
| 5,889,593 A | * | 3/1999 | Bareket ....................... 356/445 |
| 5,969,819 A | | 10/1999 | Wang |
| 6,040,910 A | * | 3/2000 | Wu et al. .................... 356/613 |
| 6,084,712 A | | 7/2000 | Harding |
| 6,100,985 A | | 8/2000 | Scheiner et al. |
| 6,630,362 B1 | * | 10/2003 | Lensing ....................... 438/14 |
| 6,717,661 B1 | * | 4/2004 | Bernstein et al. ........... 356/121 |

FOREIGN PATENT DOCUMENTS

DE 3527074 A1 5/1986

OTHER PUBLICATIONS

Jaerisch et al., "Optical Contour Mapping of Surfaces", *Applied Optics*, vol. 12, No. 7, Jul. 1973, pp. 1552–1557.
Jacquot et al., "Common–Path Holographic Interferometer for Flatness Testing", *SPIE*, vol. 2248, pp. 125–135, Optics for Productivity in Manufacturing, paper 18 (1994).

* cited by examiner

Primary Examiner—Michael P. Stafira
Assistant Examiner—Juan Valentin
(74) Attorney, Agent, or Firm—Browdy and Neimark, PLLC

(57) ABSTRACT

An imaging method and system are presented for detecting the topography of a sample surface. Illuminating light is directed to the sample by sequentially passing the illuminating light through a grating and an objective lens arrangement The grating has a pattern formed by spaced-apart transparent regions spaced by non-transparent regions, and is specifically oriented with respect to the optical axis of the objective lens arrangement. Light, specularly reflected from the sample, is collected by the same objective lens arrangement and is directed to an imaging detector through the same grating, thereby enabling creation of an image of the illuminated sample indicative of the topography of the sample surface.

28 Claims, 6 Drawing Sheets

METHOD AND SYSTEM FOR MEASURING THE TOPOGRAPHY OF A SAMPLE

FIELD OF THE INVENTION

This invention is generally in the field of optical measurement techniques and relates to a method and system for measuring the topography of a sample's surface.

BACKGROUND OF THE INVENTION

Measuring the topography of a sample is important for example in the manufacture of semiconductor devices, where a semiconductor wafer typically undergoes Chemical Mechanical Planarization (CMP) after a photolithography-etching-deposition process CMP might result in the wafer's topography induced by erosion of densely packed small feature arrays and dishing of larger features, while the ideal CMP results would be a substantially flat surface of the wafer.

Techniques enabling the topography measurements have been developed and are disclosed for example in U.S. Pat. Nos. 5,307,152, 5,671,050, 5,969,819, and 6,084,712. All these techniques utilize two diffraction gratings, and according to all these techniques, except for that of U.S. Pat. No. 5,671,050, two gratings are located, respectively, in spatially separated optical paths of illuminating and reflected light. According to the technique of U.S. Pat. No. 5,671,050, two gratings are located in the path of the incident and returned light. This is implemented locating both gratings very close to the sample.

The use of a single grating has been proposed in the following articles W. Jaerisch and G. Makosch, "Optical contour mapping of surfaces" (Applied Optics 12(7), 1552–1557 (1973), and P. Jacquot, X. Colonna de Lega and P M Boone. "Common-path interferometer for flatness testing" SPIE 2248, Optics for productivity in manufacturing, paper 18 (1994). Here, similarly to the technique of U.S. Pat. No. 5,671,050, the grating is located close to the sample (downstream of all other elements of the optical system).

SUMMARY OF THE INVENTION

The present invention provides a novel method and system for optical measurements of the topography of a sample's surface, particularly useful in optical inspection of semiconductor wafers progressing on a production line.

The main idea of the present invention consists of utilizing an imaging system defining a common path for incident and returned (specularly reflected) light components, and using a single grating accommodated in this common optical path This technique thus provides the re-imaging of the grating on itself by means of a specularly reflective sample (sample surface).

The grating is typically a mask (pattern) formed by an array (one- or two-dimensional array) of spaced-apart identical transparent regions spaced by non-transparent (blocking) regions. The grating is located in a plane perpendicular to the optical axis of the system such that the optical axis intersects with the grating.

The illumination in the system can be wide-band incoherent light due to the purely geometrical effects of this method, which is not dependent on wavelength Monochromatic or coherent light can be utilized in this system without changes to the method.

There is thus provided according to one aspect of the present invention, an imaging method for detecting the topography of a sample surface, the method comprising:

(□) directing illuminating light to the sample by sequentially passing the illuminating light through a grating and an objective lens arrangement, the grating having a pattern formed by spaced-apart transparent regions spaced by non-transparent regions, and being specifically oriented with respect to the optical axis of the objective lens arrangement, (□) collecting light, specularly reflected from the sample, by said objective lens arrangement; and (□) passing the collected specularly reflected light towards an imaging detector through said grating, thereby enabling creation of an image of the illuminated sample indicative of the topography of the sample's surface.

Preferably, the grating is placed at the back focal plane of the objective lens arrangement.

In relation to previous techniques for utilizing gratings for topographic measurements, the method of the present invention essentially performs the Moiré effect on the plane that contains the Fourier image of the sample. Other methods utilize the Moiré effect at essentially the sample plane or a conjugate thereof.

The specific orientation of the grating with respect to the optical axis may be asymmetric orientation. The term "asymmetric with respect to the optical axis" used herein signifies that the grating is placed such that the optical axis passes through the periphery of either the transparent or non-transparent region of the grating (i.e. closer to the boundary between the adjacent transparent and non-transparent regions), and not through the center of either of these regions. Preferably, this asymmetric positioning of the grating is such that the optical axis passes through a boundary between two adjacent transparent and non-transparent (opaque) regions. Due to this asymmetric accommodation of the grating perpendicular to the optical axis, the collected specularly reflected light components form on the detector an image of the sample with modulation of the intensity at different locations of the image. In this case, if the sample has a flat reflective surface perpendicular to the optical axis, the image will be dark ("nulling effect"), and if the surface has certain topography or is tilted with respect to a plane perpendicular to the optical axis, the image will contain a certain gray level pattern. This pattern contains information on the local slopes of the sample For example, a concave parabolic surface will have essentially equidistant stripes of alternating high and low gray-level.

The specific orientation of the grating may be varied during the imaging process, namely, a series of images of the sample are acquired with different orientations of the grating. In order to desensitize the image to the exact grating placement relative to the optical axis, the series of images are acquired while the grating located in the back focal plane of the objective is laterally offset in a direction perpendicular to the grating axis To facilitate measurements of a larger range of local slopes (sample's regions stronger tilted with respect to a plane perpendicular to the optical axis), the series of images is acquired while the grating is rotated in a plane perpendicular to the optical axis. Acquiring a series of images through the grating while utilizing combined grating rotation and offset mode provides for obtaining more information about the topography of the sample's surface The grating may be rotated with the presence of a certain decenter (vector) of a rotation axis from the optical axis, thereby presenting a combination of the grating rotation and offset effects This enables obtaining the full local slope information of a sample with a large range of slopes To enable enhancement of stripes' contrast in the acquired image, a grating with the filling factor larger than 50% can be used.

The method of the present invention can be used for dishing and erosion measurements (e.g., post-CMP dishing and erosion), for enhancing the image contrast for example when imaging wafers with opaque coating (e.g., for overlay metrology) as well as for controlling a semiconductor manufacturing process.

According to another aspect of the present invention, there is provided an imaging system operable to detect a topography of a sample surface, the system comprising:

(i) an illumination unit operable to produce illuminating light to be directed onto the sample;

(ii) an imaging detector; and (iii) a light directing/collecting optics defining a common path for propagation of the illuminating light and light specularly reflected from the sample, the light directing/collecting optics comprising:

(iv) a splitting assembly accommodated that spatially separates between the illuminating and specularly reflected light components and directs them towards, respectively, the sample and the imaging detector;

(v) an objective lens arrangement that focuses the illuminating light onto the sample and collects the specularly reflected light; and (vi) a grating formed by spaced-apart identical transparent regions spaced by non-transparent regions, said grating being located in said common optical path upstream of the objective lens arrangement with respect to the direction of the illuminating light propagation towards the sample, and being specifically oriented with respect to the optical axis of the objective lens arrangement;

an image of the illuminated sample obtained on the imaging detector being thereby indicative of the topography of the sample's surface.

The grating may be in the form of spaced-apart line-like regions, in the form a spiral (round or square-like) with identical black and white regions 180°-rotated with respect to each other. In this case, with the asymmetric location of the grating with respect to the optical axis, insensitivity of the image to the slope direction can be achieved. The grating may be of a checker-board pattern and placed with respect to the optical axis such that the optical axis passes through the intersection (boundary) between the corners of two adjacent regions of the pattern.

BRIEF DESCRIPTION OF THE DRAWINGS

In order to understand the invention and to see how it may be carried out in practice, a preferred embodiment will now be described, by way of non-limiting example only, with reference to the accompanying drawings, in which.

DETAILED DESCRIPTION OF THE INVENTION

Figure 1:
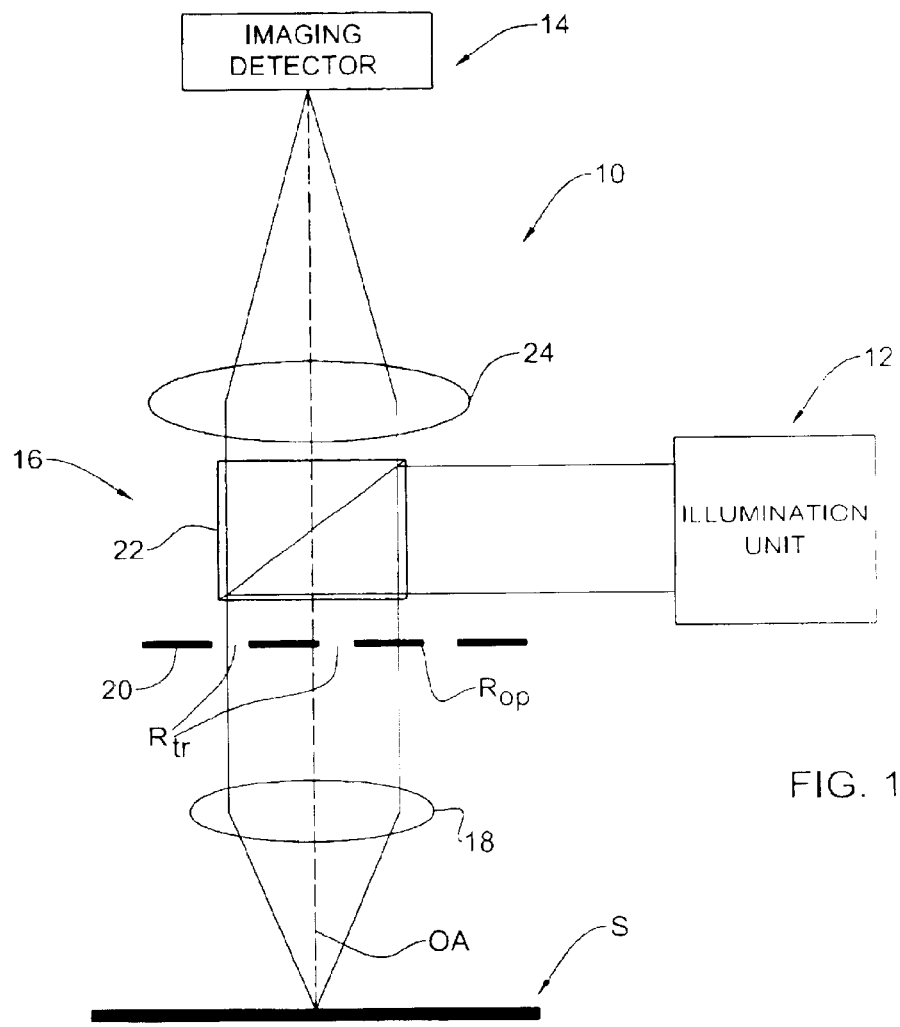
FIG. 1 is a schematic illustration of an imaging system according to the invention.

Referring to FIG. 1, there is schematically illustrated an imaging system 10 according to the invention for imaging a sample S (e.g., semiconductor wafer) The system 10 is an infinite conjugate microscope, and comprises an illumination unit 12 (including a light source that may be equipped with suitable optics such as collimator beam shaper, etc.), a detection unit 14 (for example including a CCD camera), and light directing/collecting optics 16 defining a common path for the propagation of illuminating light $L_1$ and light $L_2$ specularly reflected from the sample's surface The optics 16 includes an objective lens arrangement 18 (a single lens in the present example), a grating 20 located in the back focal plane of the objective, and a beam splitter 22 that spatially separates between the light components $L_1$ and $L_2$. Also provided in the system 10 is an imaging lens 24, which may be part of the detection unit. The objective lens arrangement 18 defines an optical axis OA As shown the grating 20 is oriented perpendicular to the axis OA and such that the axis OA passes through a boundary between adjacent transparent and opaque regions $R_{tr}$ and $R_{op}$ of the grating (asymmetric location of the grating with respect to the optical axis)

Figure 2:
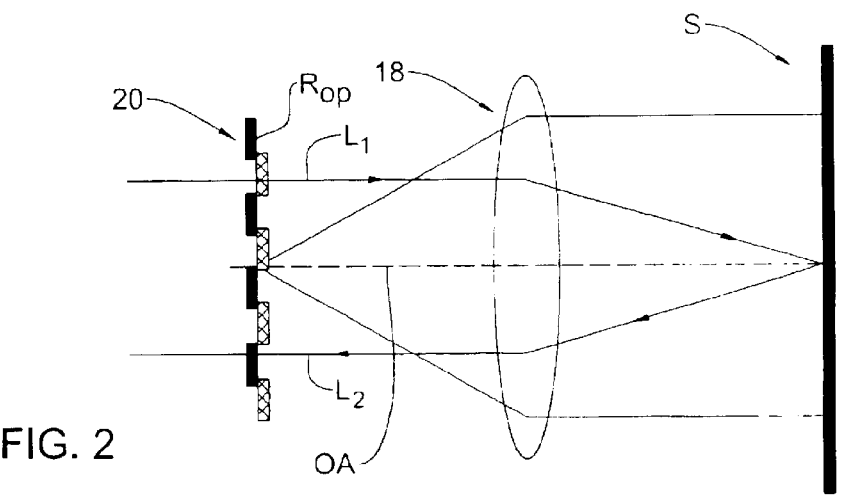
FIG. 2 more specifically illustrates the light propagation scheme between the grating and the sample in the system of FIG. 1.

FIG. 2 more specifically illustrates the light propagation scheme between the grating and the sample. As clearly shown in the figure, due to the asymmetric accommodation of the grating with respect to the optical axis OA, light components of the incident light $L_1$ that pass through the transparent region $R_{tr}$ of the grating at one side of the optical axis OA are specularly reflected $L_2$ by the sample's surface towards the opaque region $R_{op}$ at the other side of the optical axis (considering the transparent the opaque regions are of the same size) If a Ronchi Ruling grating of 50% filling is used, all the light transmitted through the grating towards the sample will be imaged onto the opaque regions (lines) of the grating and thus blocked This can be termed a "nulling effect", causing no image on the detector Hence, the specularly reflected light components reaching a detector plane form together an image of the sample with modulation of the intensity at different locations of the image determined by the relation between local sample slope and grating placement in relation to the optical axis.

Figure 3:
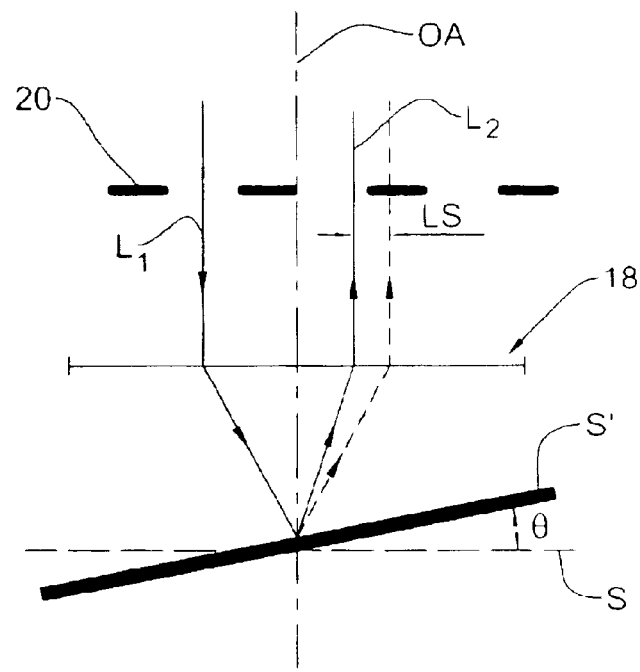
FIG. 3 compares the light propagation scheme in the case when the sample's surface is tilted with respect to a plane perpendicular to the optical axis to that of the case when the sample's surface is perpendicular to the optical axis, FIG. 4 more specifically illustrates the effect of an asymmetric grating relative to the optical axis used in the system of FIG. 1.
Figure 4:
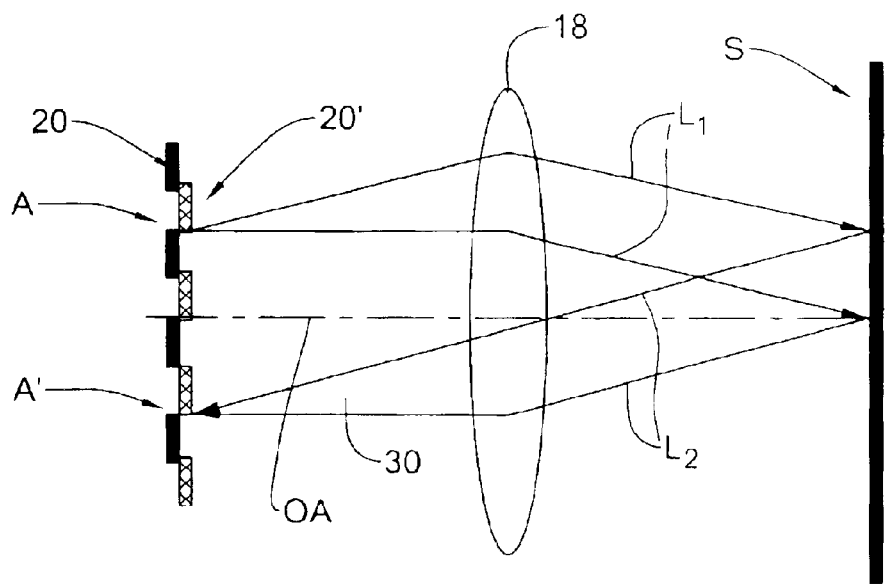

FIG. 3 schematically illustrates a light propagation scheme for the case when the sample's surface S' is tilted at an angle θ with respect to a plane perpendicular to the optical axis. It should be understood that the effect of a tilted surface onto the image obtained on the detector presents the effect of a non-flat surface of the sample, namely a surface having a certain topography including tilted regions As shown, incident light component $L_1$ that passed through the transmitting region of the grating is specularly reflected by the tilted surface S' towards another transmitting region of the grating As shown in the figure in dashed lines, with the flat surface S perpendicular to the optical axis, the same light component of the incident light is specularly reflected towards the opaque (blocking) region of the grating. A lateral shift LS between the light components specularly reflected from the tilted and perpendicular regions of the sample with respect to the optical axis is determined as follows LS 2 θF', wherein F' is the optical distance between the sample and the objective lens planes For a grating of pitch P, if the shift LS is equal to P/2, the result is the full transmission of the specularly reflected light impinging onto the grating through the grating Any smaller shift reduces the transmission. Additionally, if the shift is not P/2 but P (m+½) wherein m is an integer, a maximum in transmission will also obtained As shown in FIG. 4, the grating 20 and its image 20' are conjugate planes imaged via a mirror (the target or sample surface S) on which the collimated beam $L_1$ impinges, the source of this beam being a point A on the grating The specularly reflected beam $L_2$ is focused back at the back focal plane of the objective to a symmetric point A'. Placing the sample at a distance F' from the objective, different from the objective focal length, has no affect on the image 20', but affects only the angle of a light cone 30 relative to the optical axis OA The contrast of the image at the detector plane is not affected by the location of the sample with respect to the focal plane of the objective, as long as the detector plane location compensates for the defocus effects on the detector, i.e. the detector is in a plane conjugate with the sample An objective lens has a limit as to the lateral size of the flat-field region of the back focal plane. Tilting the sample S relative to the optical axis OA will cause a lateral shift of the imaged grating 20' relative to the object grating 20 by the distance LS, in certain cases causing a reduction in the image quality This can be compensated for by readjusting the position of the object grating 20, within a limited range such that the imaged grating 20' does not move outside the region of flat-field in the black focal plane of the lens 18.

Figure 5A:
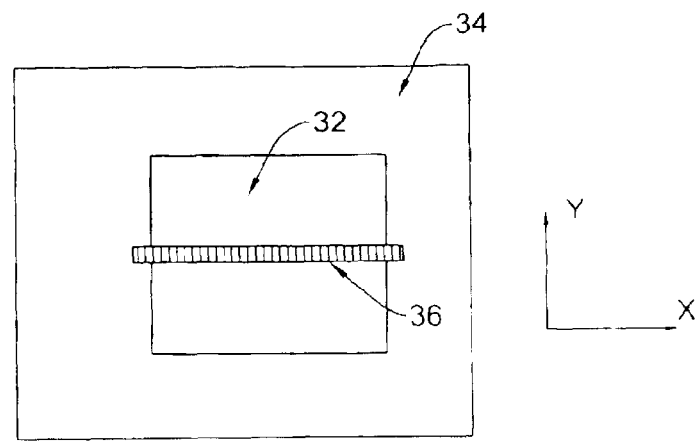
FIGS. 5A–5C exemplifies how the present invention is used for identifying a concave surface structure on the samples' surface.
Figure 5B:
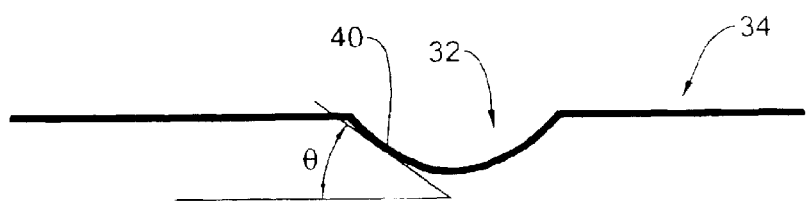
Figure 5C:
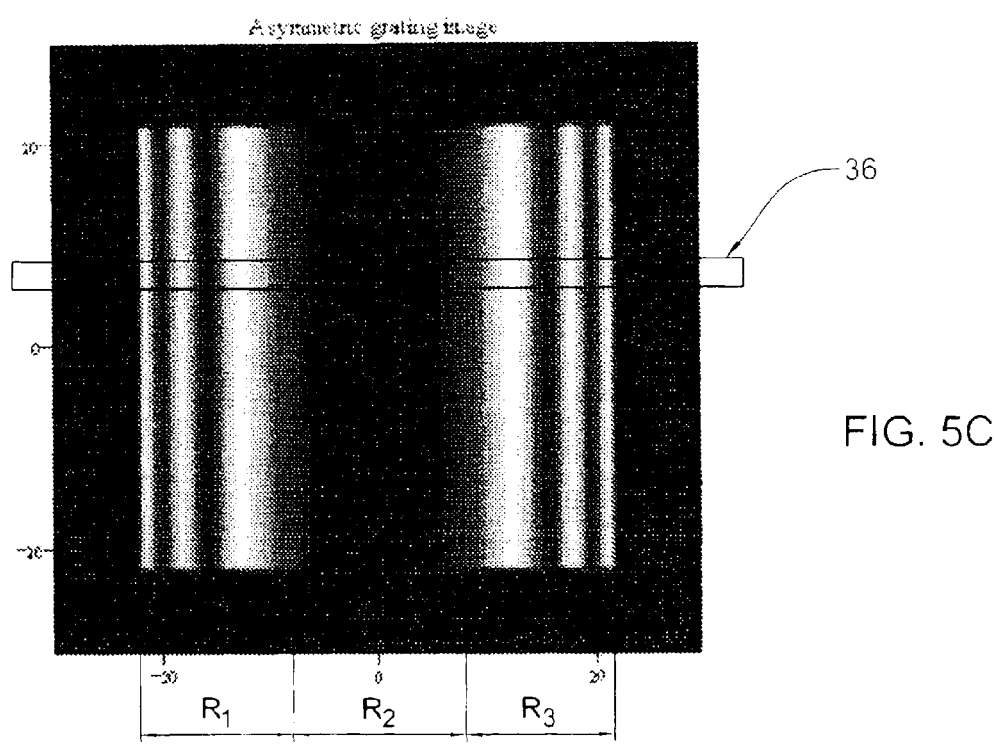

Turning now to FIGS. 5A–5C, there is an example of a target with a concave surface structure, such as a metal pad 32 exposed on the surface 34 of a processed semiconductor wafer after a chemical mechanical polishing process The pad 32 is sunken below the surrounding surface area by about 0.2 microns with a height profile defined, for example, by the following function $H(x,y)=a\cdot(x^4+y^4)$ FIG. 5C shows the image of the target 34 appearing on an area CCD camera (presenting an imaging detector of the system). Within the CCD sensing area, a row of pixels 36 will be recorded along a line perpendicular to the direction of the slope 40 defined by the angle θ formed by the concave surface structure 32 (shown in FIG. 5B) A gray level variation appears along the image stripe, the bright stripes corresponding to the local slopes 40 meeting the following criteria:

$$2\cdot\theta\cdot F'=P\cdot(m+½)$$

wherein m is integer, and P is the grating pitch.

Different stripes in the image generally correspond to different values of m, i.e., different orders of lateral shift of the grating image In the image, substantially black region $R_1$ corresponds to a substantially flat region of the target's surface perpendicular to the optical axis, and the patterned regions $R_2$ and $R_3$ correspond to the concave surface regions of the target (pad regions) with a varying angle relative to the flat surfaces (slope). The image is formed under the conditions of asymmetric grating placement. The image is normalized for local reflectivity, to enable quantitative measurements, by dividing with a reference image This reference image is obtained by capturing an image of the same area of the target without the presence of the grating and multiplying by the averaged grating transmission (50% for a symmetric Ronchi ruling). It is not always immediately clear whether the target is concave or convex from an image such as this. This ambiguity can be solved.

The following is the description of the various operational modes used for measurements:

1. Grating offset mode

In order to desensitize the system to the need for exact grating placement relative to the optical axis, data can be collected from a series of images acquired when the grating located in the back focal plane of the objective is laterally offset in a direction perpendicular to the grating axis. This also solves issues of ambiguity of the direction of the sample curvature.

Figure 6:
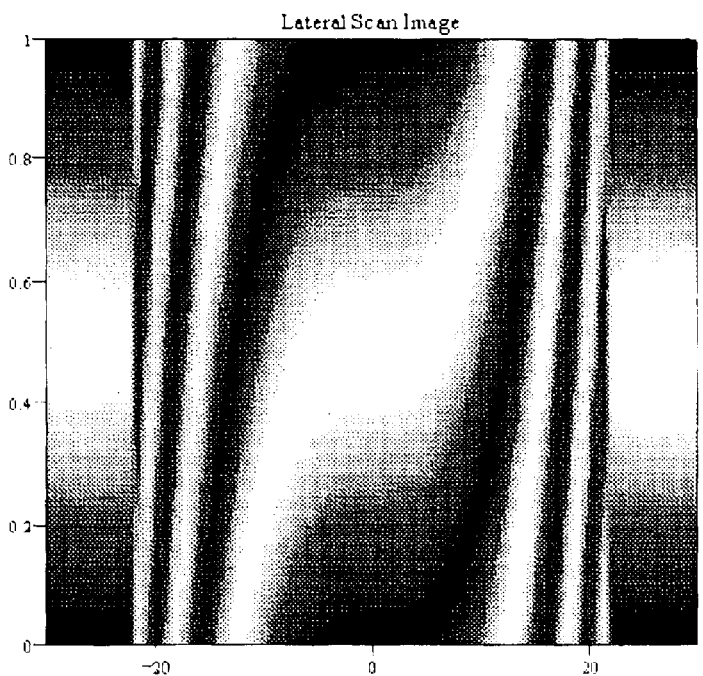
FIG. 6 exemplifies imaging of the sample by utilizing varying lateral shifts of the grating in the system of FIG. 1.

FIG. 6 illustrates a synthetic two-dimensional image (simulation) obtained by acquiring a series of one-dimensional images collected from a single line of pixels, with varying lateral shifts of the grating (along the Y-axis). As shown, the images obtained with the grating offset equal to "0" and "1" (integral number of the half grating pitch) are identical, and vary when the grating offset is between "0" and "1". In this image, the bright lines meet the following parametric criteria.

$$2\cdot\theta\cdot F'-\text{Offset}=P\cdot(m+½)$$

wherein the variables are θ and Offset.

Treating the image as a 2-dimensional graph, the maxima in the image reproduce the shape of the graph of Local Slope vs Lateral Location within the line of pixels 36. Seven separate white bands in the example of FIG. 6 can be unfolded into one continuous curve of Slope vs Lateral Location. Based on the knowledge of the grating pitch and the scaling of the grating lateral offset, the slope profile can be calculated directly from the image.

To produce the height profile, the slope results obtained above undergo integration in the lateral location coordinate The integration constant can be deduced from the data obtained on the flat areas outside the examined area 32 and/or from the fact that the center of the examined area is substantially flat in normal symmetrical cases (i.e., incident light impinges onto the sample along an axis substantially perpendicular to the surface plane, and the concave surface region is substantially symmetrical).

Collecting such a series of images provides enhanced resolution due to the fact that each stripe in the image, related to a lateral shift order m, continuously scans across the varying slope angles. Additionally, the resolution of the image in the Offset axis can be much larger than the resolution of the CCD pixels in the plane of the sample For a specific optical system with a given magnification to the CCD, a grating of pitch P can be found to cover a specific range of slope Considering a system with an effective imaging resolution R in the sample plane, and supposing the rate of change of the slope (i.e. curvature C dθdX ) the curvature resolution can be approximated by examining the expression $(\theta_1-\theta_2)$ R In the worst-case measurable scenario, the change from flat to maximum-angle tilted region takes place within one resolution length, therefore dθdX can be maximized to $\theta_{max}/R$. In order to map the maximum curvature, an image with successive orders should be obtained at the required small slope and large slope areas The condition for a maximum in the image is:

$$2\cdot\theta\cdot F'=P\cdot(m+½)$$

Therefore, the slope angle difference between successive orders is $$(\theta_{min}/-\theta_m)=(P\cdot½)/F'$$

Hence, for the flat to maximum-angle case:

$$\theta_{max}/R<(P\cdot½)/(F'\cdot R)$$

Therefore, the requirement for the pitch P to enable resolution of the maximum curvature is:

$$P>2\cdot\theta_{max}\cdot F'$$

On the other hand, the criteria for fine height resolution are different Considering the minimum required height resolution H using the imaging resolution R, the required minimum detectable angle is:

$$\theta_{min}=H/R$$

For detection using the "first order" stripe, using the relation 2·θ·F'P (m+½), for m=0 we have $$P < 4 \cdot \theta_{min} \cdot F'$$

Using signal analysis techniques it is possible to extract the slope information (for example by peak finding algorithms) at the "sub-stripe-cycle" resolution Considering a 10 time resolution enhancement, the minimum slope angle can be differentiated using a coarser pitch $$2 \cdot \theta_{max} \cdot F' < P < 4 \cdot \theta_{min} \cdot F' \cdot 10$$

Choosing a pitch in the above window enables measurement of the dynamic range for the slope angle satisfying the following condition $$\theta_{max}/\theta_{min} < 20$$

To enable measurement of a larger range of slopes, a variation of pitch is needed. This can be achieved by a grating rotation mode 2. Grating rotation mode In the case of large range of slopes, a technique to overcome this limitation is to rotate the grating within the plane perpendicular to the optical axis The effective pitch $P_{eff}$ related to each local point is determined as follows $$P_{eff} = P/\cos(\phi)$$

wherein the angle $\phi$ is measured between the vector perpendicular to the grating lines (in the plane of the grating) and the horizontal projection of the vector of local steepest descent on the sample.

Figure 7:
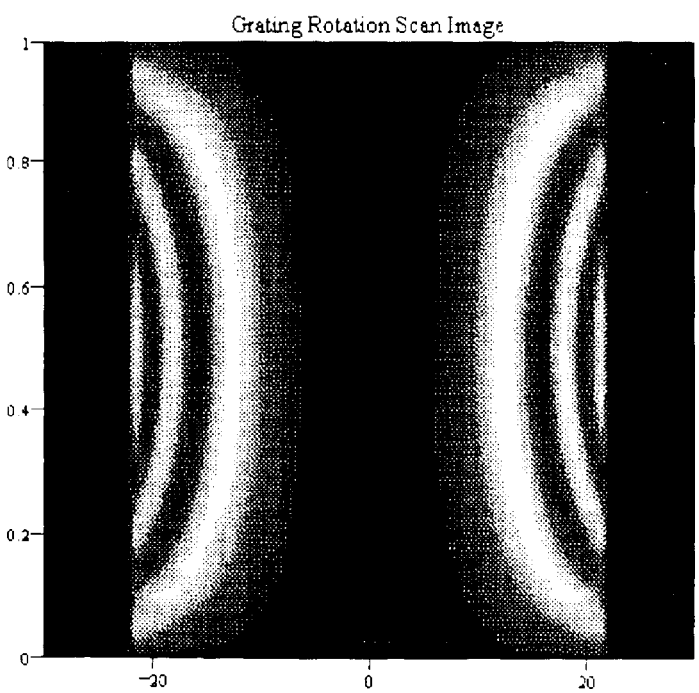
FIG. 7 exemplifies imaging of the sample by operating the system of FIG. 1 with a grating rotation mode.

FIG. 7 illustrates a synthetic two-dimensional image (simulation) obtained with the grating rotation mode. The image can be built up by acquiring a series of one-dimensional images collected from a single row of pixels from successive frames The successive frames are obtained while varying the grating orientation angle $\phi$. The horizontal axis in the image is the distance across the examined line perpendicular to the slope, and the vertical Y axis is the angle of the grating $\phi$. In this type of synthetic image, each order draws an arc whose length depends on the range of slopes on the sample.

The synthetic image contains information of various pitches for each pixel on the examined line. In this image the bright lines again meet a parametric criteria $$2 \cdot F \cdot \theta \cdot \cos(\phi) - \text{Offset} = P \cdot (m + \tfrac{1}{2})$$

wherein the variables for matching the image are local $\theta$, Offset and $\phi$.

Figure 8:
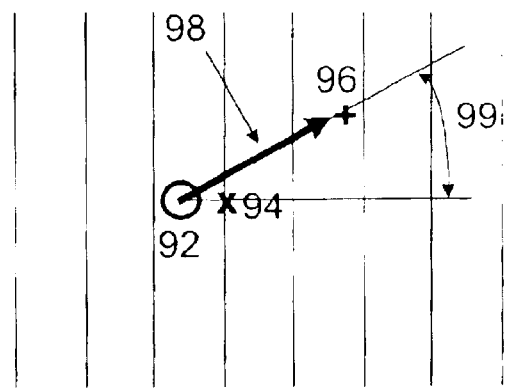
FIGS. 8 and 9 exemplify imaging of the sample by utilizing a grating rotation with the presence of a decenter of the rotation axis from the optical axis of the system.
Figure 9:
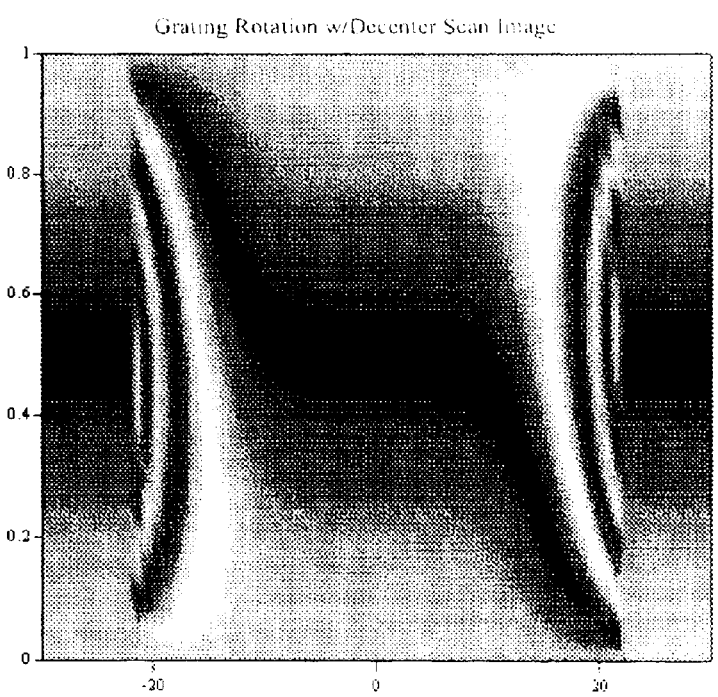

The synthetic image can be analyzed based on the above equation, and the profile of the local $\theta$ along the line can be found The local height profile can be reconstructed by integrating the slope along the line 3. Combined grating rotation and offset mode Reference is now made to FIGS. 8 and 9, illustrating the case of grating rotation with the presence of a decenter (vector 98) of the rotation axis 92 from the optical axis 96. In this case, a synthetic image obtained on the imaging detector (FIG. 9) contains a combination of the grating rotation and offset effects The condition for intensity maxima in the synthetic image, formed as in the previous section, is now $$2 \cdot F \cdot \theta \cdot \cos(\phi) - \text{Offset} + \text{Decenter} * \cos(\phi - \phi_0) \cdot P * (m + \tfrac{1}{2}),$$

wherein Offset is that of the grating rotation axis 92 from the asymmetry axis 94 in the grating frame of reference (distance perpendicular to the grating direction, within the grating plane), and the length Decenter and direction $\phi_0$ (99 in FIG. 8) at grating angle $\phi=0$ are parameters defining the vector 98 between the axis of rotation 92 and the optical axis 96.

The parameters needed for optimizing the maxima in the image are as follows local $\theta$, $\phi$, Offset, Decenter and $\phi_0$. The parameters Offset, Decenter and $\phi_0$ can be calibrated on a known sample. The synthetic image can then be analyzed based on the above equation, and the profile of the local $\theta$ along the line can be found The local height profile can be reconstructed by integrating the slope along the line 4. Image stripe contrast enhancement The basic profile of the intensity of the stripes on the sample is formed by convolution of the object grating and the image grating This gives a regular triangular intensity profile ("sawtooth"). The contrast of this pattern is degraded by such factors as optical aberrations and defocus. It can be approximated by a $(\sin^2)$-function To achieve an enhanced imaging resolution for more accurate determination of the center of the white bands, gratings with filling factor larger than 50% can be used The convolution in his case gives narrow triangular profile bands with a wide dark stripe between them. This comes at the expense of a reduced signal level The following are examples showing how the technique of the present invention can be used in various applications.

EXAMPLE 1

Dishing Measurement

The technique of the present invention can be used to measure the post-CMP dishing profile of metal pads or other large structures on processed semiconductor wafers. The depth can be measured by integrating the slope function obtained by one of the above modes or a combination thereof, utilizing the information of the slope at the center of the measurement site in relation to the surface of the surrounding field regions. The limitation of a maximum measurable slope is reached when the local dishing slope angle is near the angle at which the incident light emerges from the edge of the objective aperture. In this case, the reflected light cone does not overlap the aperture. If the slope of the dishing is very steep near the edges of the measurement site in relation to the system spot size and the CCD pixel image size on the wafer, then complete information on the step height at the edge cannot be provided, and in order to obtain the total step height information at the edge of a conventional spectrophotometric channel can be used, measuring on a spot that covers both the dishing area and the surrounding field area. Using the method disclosed in U.S. Pat. No. 6,100,985, assigned to the assignee of the present application (which is therefore incorporated herein by reference with respect to this specific example), the step height can be analyzed in this case where most of the signal is that coming from the two relatively flat areas of the site.

In addition, adjustment of the grating offset can be used to "turn off" the reflection from specific areas on the wafer prior to spectrophotometric measurements Operating with the grating in a symmetric position can reduce the signal from the steep slope region. This can enable the cleaner measurement of the step height Conversely working in "dark field" mode, i.e. asymmetric grating placement, cancels the signals from flat areas and leaves only that from the steep regions.

EXAMPLE 2

Measurement of Post-CMP Erosion

Erosion of fine patterned structures can be measured in a similar fashion to dishing, due to the fact that small submicron pitch structures diffract all orders totally out of the system aperture (apart from the zero order). Most of the specularly reflected light of the zero diffraction order comes from the metallic portions of the structure, thus enabling measurements of the slope of a copper surface

EXAMPLE 3

Image Contrast Enhancement on Samples with Opaque Coating

Figure 10:
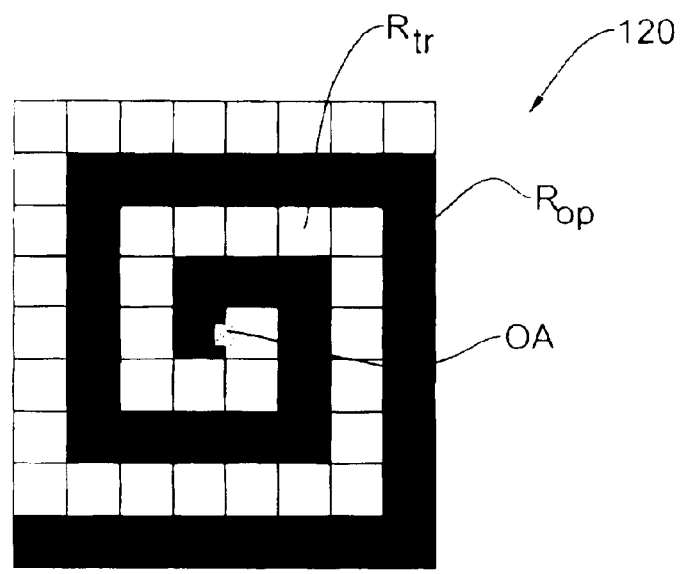
FIG. 10 exemplifies a grating with a spiral-like patterned formed by identical black and white regions 180°-rotated with respect to each other, suitable to be used in the system of FIG. 1.
Figure 11:
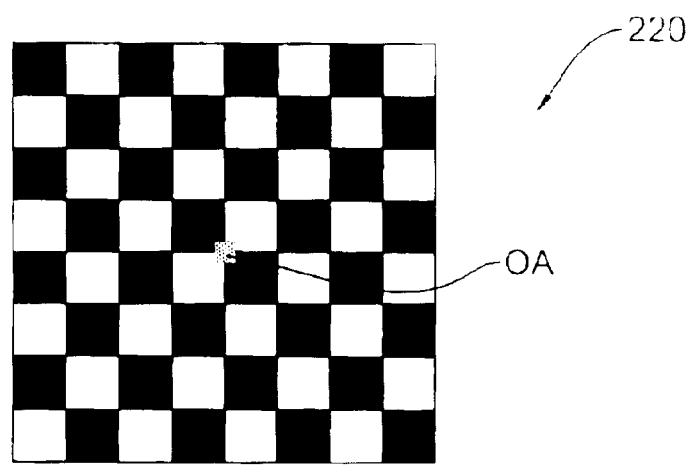
FIG. 11 exemplifies the use of a grating having a checkerboard pattern

The present invention can be utilized for the contrast enhancement (similar to the effect of dark field illumination) on processed samples with an opaque coating, under conditions where the conventional dark-field based techniques cannot operate. Smooth surfaces do not easily provide a signal in conventional dark-field illumination due to the lack of large-angle scattering and diffraction effects Working on smooth surfaces, the present invention can be used by inserting a grating with relatively small pitch to obtain sensitivity to local slopes of 0.1° or less For example, the use of an objective with focal length F=20 mm and grating of pitch P=100 µm at the back focal plane of the objective will provide detection of a first order signal at a local slope of 0.07°. Image modulation, for example for pattern recognition purposes can be achieved both for the asymmetric and symmetric cases of grating location with respect to the optical axis of the objective. In the asymmetric case, an otherwise homogenously dark image will exhibit bright areas in sloped regions In the symmetric case an otherwise homogenously bright image will exhibit dark areas in sloped regions For this specific application, the quantitative properties needed for slope mapping are relaxed. A grating can be designed for the asymmetric case with insensitivity to the slope direction by using a spiral with identical black and white patterns 180°-rotated with respect to each other. These can be "round" or "square" spirals as illustrated in FIG. 10, showing a grating 120 with such a spiral-like pattern of transparent and non-transparent regions $R_{tr}$ and $R_{op}$. In the figure, a gray square shows the location of the optical axis OA of the objective. As shown in FIG. 11 for the symmetric case, a grating 220 having a checkerboard pattern can be used, placed with respect to the optical axis OA, such that the axis passes through the intersection (boundary) between the corners of two adjacent regions of the pattern (the optical axis is marked as a gray square). The resolution for the slope sensitivity is defined by the thickness of the lines and dimension of the squares This technique can be utilized for pattern recognition on processed semiconductor wafers, such as metal-coated damascene structures or polysilicon coated structures in which the topography transferred to the surface is very smooth.

EXAMPLE 4

Image Contrast Enhancement on Wafers with Opaque Coating for Use in Overlay Metrology This mode can be utilized for contrast enhancement in optical systems that require enhancement of the images of small slopes without affecting the normal image A well-known problem in overlay-registration measurement based on image analysis of box-in-box type alignment targets is the one of metal applications In these applications, a box formed on metal is often of very low contrast as it is formed by slight indentations in the metal surface.

Inserting a grating, of the type shown in FIG. 11, in the back focal plane of the system objective with the intersection aligned on the optical axis, will give a bright field on most of the image. The intensity will be 50% of that obtained without the grating. The axis of the checkerboard pattern can be aligned along the main axes of the optical system. The indentations, which form the alignment target on the metal surface, with slopes on the order of 0.1 degrees, will be enhanced due to at least partial blockage by the grating.

Those skilled in the art will readily appreciate that various modifications and changes can be applied to the embodiments of the invention as hereinbefore exemplified without departing from its scope defined in and by the appended claims.

What is claimed is:

1. An imaging method for detecting the topography of a sample's surface, the method comprising:
   (i) passing collimated illuminating light through a grating pattern formed by spaced-apart transparent regions spaced by non-transparent regions to an objective lens arrangement, focusing the illuminating light on the sample located in a focal plane of said objective lens arrangement, thereby illuminating the sample with light spatially modulated in accordance with the grating pattern;
   (ii) collecting light, specularly reflected from the sample, by said objective lens arrangement; and
   (iii) passing the collected specularly reflected light over a common path with the collimated illuminating light through the same grating pattern towards an imaging detector located at a conjugate plane of the sample, thereby enabling creation of an image of an illuminated region of the sample indicative of a local slope of the sample's surface within said region, and thereby indicative of the topography of the sample's surface within said illuminated region.

2. The method according to claim 1, wherein the grating is placed at the back focal plane of the objective lens arrangement.

3. The method according to claim 2, wherein said grating is oriented with respect to an optical axis of the objective lens arrangement asymmetrically, the optical axis passing through the periphery of either transparent or non-transparent region of the grating, to thereby form the essentially dark-field image of the illuminated region.

4. The method according to claim 2, wherein said grating is oriented with respect to an optical axis of the objective lens arrangement asymmetrically, the optical axis passing through a boundary between two adjacent transparent and non-transparent regions of the grating, to thereby form the essentially dark-field image of the illuminated region.

5. The method according to claim 1, wherein orientation of the grating with respect to an optical axis of the objective lens arrangement is varied during the imaging process.

6. The method according to claim 5, wherein a series of the images of the sample are acquired while the grating located in the back focal plane of the objective lens arrangement is laterally offset in a direction perpendicular to the grating axis.

7. The method according to claim 5, wherein a series of the images of the sample are acquired while the grating located in the back focal plane of the objective lens arrangement is rotated in a plane perpendicular to the optical axis.

8. The method according to claim 6, wherein the series of the images of the sample are acquired while the grating is rotated in a plane perpendicular to the optical axis.

9. The method according to claim 7, wherein the grating is rotated with a certain decenter of a rotation axis from the optical axis.

10. The method according to claim 1, wherein the grating has a filling factor larger than 50%.

11. The method according to claim 1, wherein detection of the local slope of the sample's surface is indicative of at least one of dishing and erosion effects caused by a Chemical Mechanical Planarization applied to the semiconductor wafer sample.

12. The method according to claim 1, used for enhancing an image contrast.

13. The method according to claim 12, used for overlay metrology of the semiconductor wafer sample with an opaque coating.

14. The method according to claim 1, used for controlling a process of manufacturing the semiconductor wafer samples.

15. The method according to claim 1, wherein the grating is located with respect to the objective lens arrangement such that an axis of symmetry of the grating coincides with the optical axis of the objective lens arrangement, to thereby form the essentially bright-field image of the illuminated region.

16. The method according to claim 1 wherein the grating is a two-dimensional grating used for contrast enhancement.

17. A method for controlling a process of Chemical Mechanical Planarization (CMP) applied to semiconductor wafers progressing on a production line, the method comprising:

(i) directing illuminating light to the processed wafer located at a focal plane of an objective lens arrangement by passing collimated illuminating light through a grating pattern formed by spaced-apart transparent regions spaced by non-transparent regions, and then through the objective lens arrangement, thereby illuminating the wafer with light spatially modulated in accordance with the grating pattern;

(ii) collecting light, specularly reflected from the wafer, by said objective lens arrangement; and (iii) passing the collected specularly reflected light over a path common with the collimated illuminating light through the same grating pattern towards an imaging detector located at a conjugate plane of the wafer, thereby enabling creation of an image of an illuminated region of the wafer indicative of a local slope of the wafer's surface within said region, and thereby indicative of at least one of erosion and dishing effects caused by the CMP applied to the wafer.

18. An imaging system operable to detect a local slope across a sample surface, the system comprising:

(a) an illumination unit operable to produce collimated illuminating light;

(b) an imaging detector; and (c) a light directing/collecting optics defining a common path for propagation of the illuminating light and light specularly reflected from the sample, the light directing/collecting optics comprising:

(d) a splitting assembly accommodated for spatially separating between the illuminating and specularly reflected light components and directs them towards, respectively, the sample and the imaging detector;

(e) grating having a pattern formed by spaced-apart identical transparent regions spaced by non-transparent regions, said grating pattern being located in said collimated light optical path and in the optical path of collected light specularly reflected from the sample; and (f) an objective lens arrangement located downstream of said grating with respect to a direction of propagation of the collimated illuminating light and focusing the illuminating light onto the sample and collecting the light specularly reflected from the sample; the system thereby providing for illumination of the sample with collimated light spatially modulated in accordance with the grating pattern, and providing for creation of an image of the illuminated sample on the imaging detector, said image being formed by the specularly reflected light from the illuminated sample spatially modulated in accordance with the same grating pattern, and being thereby indicative of the local slope across the sample's surface.

19. The system according to claim 15, wherein the grating is placed at the back focal plane of the objective lens arrangement.

20. The system according to claim 19, wherein said grating is oriented with respect to an optical axis of the objective lens arrangement asymmetrically, the optical axis passing through the periphery of either transparent or non-transparent region of the grating, the system thereby creating the essentially dark-field image of the illuminated sample on the detector.

21. The system according to claim 19, wherein the grating is oriented with respect to the objective lens arrangement asymmetrically, an optical axis of the objective lens arrangement passing through a boundary between the two adjacent transparent and non-transparent regions, the system thereby creating the essentially dark-field image of the illuminated sample on the detector.

22. The system according to claim 18, wherein the grating has a one-dimensional array of said spaced-apart regions.

23. The system according to claim 18, wherein the grating has a two-dimensional pattern of said spaced-apart regions.

24. The system according to claim 18, wherein said regions in the grating are arranged in a spiral-like pattern, with the identical transparent and non-transparent regions being 180°-rotated with respect to each other.

25. The system according to claim 18, wherein said regions in the grating are arranged in a checker-board pattern.

26. The system according to claim 25, wherein the grating is oriented with respect to the objective lens arrangement such that an optical axis of the objective lens arrangement passes through a boundary between corners of the two adjacent regions.

27. The system according to claim 18, wherein the grating is located with respect to the objective lens arrangement such that an axis of symmetry of the grating coincides with the optical axis of the objective lens arrangement, to thereby form the essentially bright-field image of the illuminated region.

28. The system according to claim 18, wherein the grating is a two-dimensional grating used for contrast enhancement.

* * * * *